(12) United States Patent
Yoshioka et al.

(10) Patent No.: US 11,007,986 B2
(45) Date of Patent: May 18, 2021

(54) STEERING DEVICE AND CARGO HANDLING VEHICLE

(71) Applicant: Mitsubishi Logisnext Co., Ltd., Kyoto (JP)

(72) Inventors: Masahiro Yoshioka, Kyoto (JP); Takuya Sano, Kyoto (JP)

(73) Assignee: MITSUBISHI LOGISNEXT CO. LTD., Kyoto (JP)

( * ) Notice: Subject to any disclaimer, the term of this patent is extended or adjusted under 35 U.S.C. 154(b) by 209 days.

(21) Appl. No.: 16/407,274

(22) Filed: May 9, 2019

(65) Prior Publication Data

US 2019/0359186 A1     Nov. 28, 2019

(30) Foreign Application Priority Data

May 28, 2018   (JP) .............................. JP2018-101487

(51) Int. Cl.
| | |
|---|---|
| *B60T 7/10* | (2006.01) |
| *B60T 7/08* | (2006.01) |
| *B60T 11/04* | (2006.01) |
| *B62D 1/16* | (2006.01) |
| *B66F 9/075* | (2006.01) |

(52) U.S. Cl.
CPC ................ *B60T 7/08* (2013.01); *B60T 7/102* (2013.01); *B60T 11/046* (2013.01); *B62D 1/16* (2013.01); *B66F 9/07509* (2013.01); *B66F 9/07568* (2013.01)

(58) Field of Classification Search
CPC .... B62D 1/16; B66F 9/07509; B66F 9/07568; B60T 7/08; B60T 7/10; B60T 7/047
See application file for complete search history.

(56) References Cited

U.S. PATENT DOCUMENTS

| | | | | |
|---|---|---|---|---|
| 2,248,364 A | * | 7/1941 | Leach | B60W 30/18 |
| | | | | 74/485 |
| 2,523,491 A | * | 9/1950 | Auten | B60K 26/02 |
| | | | | 477/209 |
| 2,537,222 A | * | 1/1951 | Horne | B60T 7/10 |
| | | | | 74/484 R |
| 2,945,571 A | * | 7/1960 | Yanda | B60T 7/08 |
| | | | | 192/219.6 |
| 3,188,883 A | * | 6/1965 | Fender | B60T 7/047 |
| | | | | 74/534 |

(Continued)

FOREIGN PATENT DOCUMENTS

| | | | | |
|---|---|---|---|---|
| DE | 102009013116 A1 | * | 9/2010 | ............. B62D 1/183 |
| FR | 2784638 A1 | * | 4/2000 | ............. B60K 23/02 |

(Continued)

*Primary Examiner* — Ruth Ilan
(74) *Attorney, Agent, or Firm* — Kirschstein, Israel, Schiffmiller & Pieroni, P.C.

(57) ABSTRACT

A steering device includes: a steering handle; an upper shaft to which the steering handle is connected; a lower shaft that is disposed below the upper shaft; a universal joint that connects the upper shaft with the lower shaft; a column tube that covers an outer periphery of the upper shaft; and a parking brake release lever. The column tube has a lever backing bracket that supports the parking brake release lever swingably around an axis orthogonal to an axial direction of the upper shaft, and the parking brake release lever is disposed under the column tube.

7 Claims, 5 Drawing Sheets

(56) References Cited

U.S. PATENT DOCUMENTS

| | | | | |
|---|---|---|---|---|
| 4,217,792 A * | 8/1980 | Kesling | B62D 1/16 | |
| | | | 280/775 | |
| 4,421,214 A * | 12/1983 | Sellmeyer | B60T 7/047 | |
| | | | 192/219.7 | |
| 4,615,192 A * | 10/1986 | Brown | B60R 25/08 | |
| | | | 70/181 | |
| 5,186,073 A * | 2/1993 | Doolittle | B60T 7/047 | |
| | | | 29/453 | |
| 6,341,539 B1 * | 1/2002 | Tsuda | B60T 7/047 | |
| | | | 116/58 A | |
| 6,973,851 B2 * | 12/2005 | Stadler | B60T 7/047 | |
| | | | 74/502 | |
| 9,216,758 B2 * | 12/2015 | Kerler | B60T 11/21 | |
| 2019/0359244 A1 * | 11/2019 | Yoshioka | B66F 9/07568 | |

FOREIGN PATENT DOCUMENTS

| | | |
|---|---|---|
| JP | S61-122152 | 8/1986 |
| JP | S62-082877 | 5/1987 |
| JP | H11-078654 | 3/1999 |
| JP | 2000-108857 | 4/2000 |
| JP | 2004-203276 | 7/2004 |

* cited by examiner

STEERING DEVICE AND CARGO HANDLING VEHICLE

BACKGROUND OF THE INVENTION

1. Field of the Invention

The present invention relates to a steering device and a cargo handling vehicle which include a parking brake release lever.

2. Description of the Related Art

In general, a parking brake release lever is known as an operation device that cancels braking performed by a parking brake device (see JP 2000-108857 A and JP 2004-203276 A).

The parking brake release lever described in JP 2000-108857 A, is supported by a support tube that supports a shift lever and is disposed on a left side of a steering handle.

The parking brake release lever described in JP 2004-203276 A serves as a lever that triggers a parking brake device and is provided beside a shift lever, on an outer tube of a steering device, or on an instrument panel, thereby, similarly to JP 2000-108857 A, being disposed on a left side of a steering handle.

However, in the parking brake release levers described in JP 2000-108857 A and JP 2004-203276 A, a problem arises in that it is difficult for a driver who faces the steering handle to operate the release lever with the right hand. In addition, a problem arises in that the release lever is noticeable, and thereby a visual quality is impaired.

SUMMARY OF THE INVENTION

The invention is made with consideration for such circumstances described above, and an object thereof is to provide a steering device and a cargo handling vehicle in which it is possible to easily operate a parking brake release lever, and it is possible to prevent a visual quality from being impaired.

In order to solve the problems described above, there is provided a steering device including: a steering handle; an upper shaft to which the steering handle is connected; a lower shaft that is disposed below the upper shaft; a universal joint that connects the upper shaft with the lower shaft; a column tube that covers an outer periphery of the upper shaft; and a parking brake release lever. The column tube has a lever backing bracket that supports the parking brake release lever swingably around a horizontal axis orthogonal to an axial direction of the upper shaft, and the parking brake release lever is disposed under the column tube.

According to the invention, the steering device may further include: a cable that is connected to a parking brake device; a cable holding member that holds the cable; and a link mechanism that links the parking brake release lever with the cable holding member. The column tube may have a cable backing bracket that supports the cable holding member swingably around an axis parallel to the horizontal axis, and the cable holding member may be disposed on a side of the column tube.

According to the invention, in the steering device, the link mechanism may have a configuration in which a swing angle of the cable holding member is larger than a swing angle of the parking brake release lever.

According to the invention, the steering device may further include a column cover that covers the column tube. The parking brake release lever may have a metal main lever member and a resin exterior member that covers the main lever member, and the column cover and the exterior member may house the link mechanism and the cable holding member.

According to the invention, there is provided a cargo handling vehicle including: a main vehicle body; a parking brake device that inhibits traveling of the main vehicle body; a steering handle; an upper shaft to which the steering handle is connected; a lower shaft that is disposed below the upper shaft; a universal joint that connects the upper shaft with the lower shaft; a column tube that covers an outer periphery of the upper shaft; and a parking brake release lever. The column tube has a lever backing bracket that supports the parking brake release lever swingably around a horizontal axis orthogonal to an axial direction of the upper shaft, and the parking brake release lever is disposed under the column tube.

According to the invention, the cargo handling vehicle may further include: a cable that is connected to the parking brake device; a cable holding member that holds the cable; and a link mechanism that links the parking brake release lever with the cable holding member. The column tube may have a cable backing bracket that supports the cable holding member swingably around an axis parallel to the horizontal axis, and the cable holding member may be disposed on a side of the column tube.

According to the invention, in the cargo handling vehicle, the link mechanism may have a configuration in which a swing angle of the cable holding member is larger than a swing angle of the parking brake release lever.

According to the invention, the cargo handling vehicle may further include a column cover that covers the column tube. The parking brake release lever has a metal main lever member and a resin exterior member that covers the main lever member, and the column cover and the exterior member may house the link mechanism and the cable holding member.

According to the invention, the cargo handling vehicle may further include a parking brake pedal that operates the parking brake device. The parking brake device in a state of permitting the traveling of the main vehicle body may start to inhibit the traveling of the main vehicle body by an operation of the parking brake pedal, and the parking brake device in a state of inhibiting the traveling of the main vehicle body may cancel the inhibiting of the traveling of the main vehicle body by simultaneous operations of both the parking brake release lever and the parking brake pedal.

According to the invention, it is possible to provide a steering device and a cargo handling vehicle in which it is possible to easily operate a parking brake release lever, and it is possible to prevent a visual quality from being impaired.

DETAILED DESCRIPTION OF THE PREFERRED EMBODIMENTS

Figure 1A:
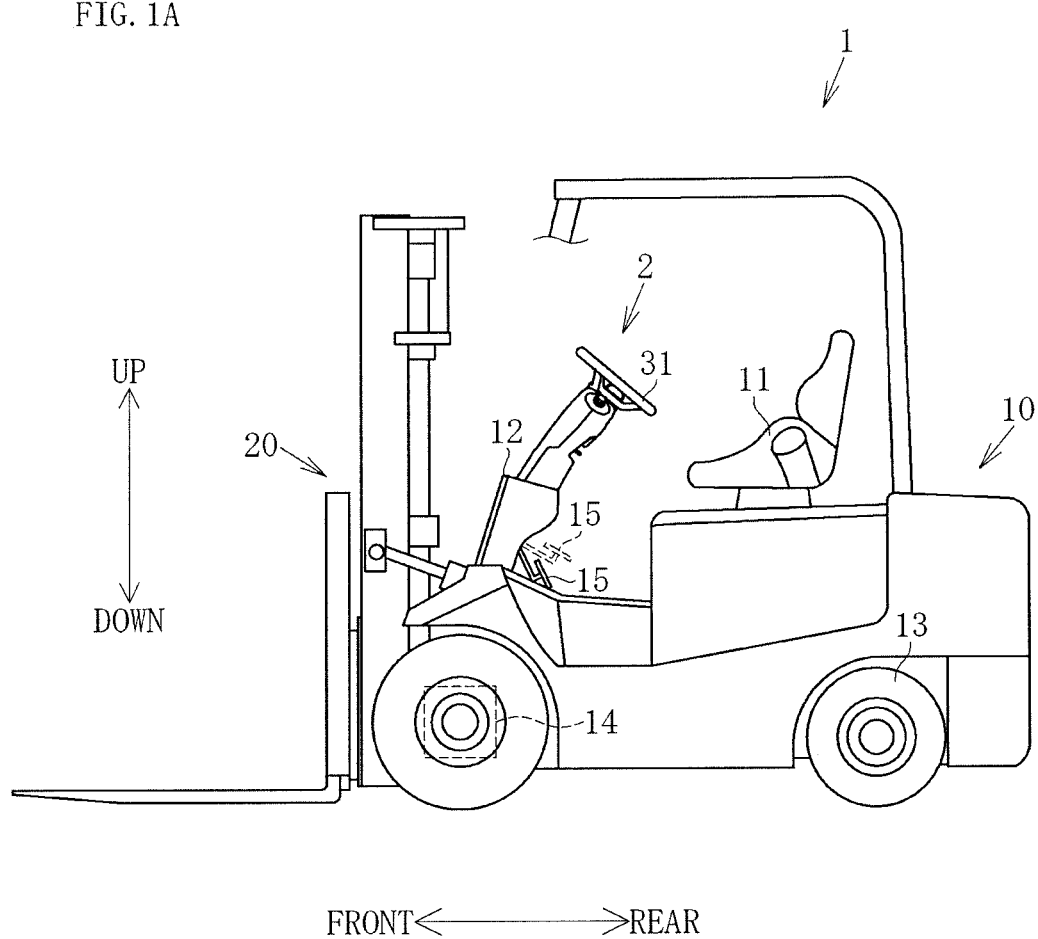
FIG. 1A is an outline view illustrating a schematic configuration of a cargo handling vehicle according to an embodiment of the invention.
Figure 1B:
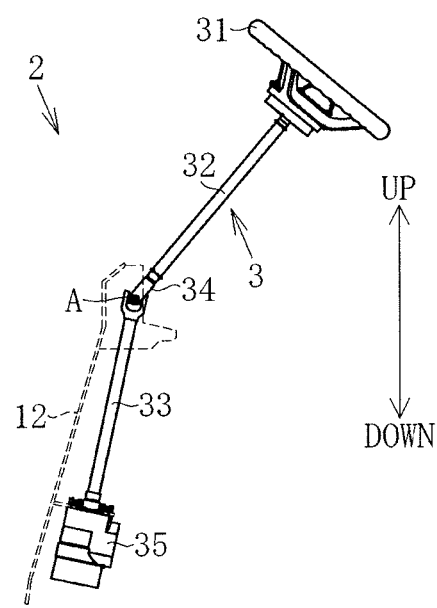
FIG. 1B is an outline view illustrating a schematic configuration of a steering device provided in the cargo handling vehicle.

An embodiment of the invention will be described with reference to the drawings. FIG. 1A is an outline view of a battery powered counterbalance forklift which is a cargo handling vehicle 1, and FIG. 1B is an outline view of a steering device 2.

As illustrated in FIG. 1A, the cargo handling vehicle 1 includes a main vehicle body 10 on which an operator (not illustrated) gets and a cargo handling device 20 that performs loading and unloading. The cargo handling vehicle 1 includes, as elements provided on the main vehicle body 10, a operator seat 11, a cowl 12, vehicle wheels 13, a parking brake device 14 (hereinafter, referred to as the "brake device 14"), a parking brake pedal 15 (hereinafter, referred to as the "pedal 15"), and the steering device 2.

The operator seat 11 is provided such that an operator is seated toward a front side. The cowl 12 is fixed to a front end portion of the main vehicle body 10 and is disposed in front of the operator seat 11 in order to protect the operator who is seated in the main vehicle body 10. The vehicle wheels 13 change an orientation depending on an operation of the steering device 2 by the operator.

The brake device 14 inhibits traveling of the main vehicle body 10 when the operator gets off the main vehicle body 10. The brake device 14 in a state of permitting the traveling of the main vehicle body 10 starts to inhibit the traveling of the main vehicle body 10 by an operation of the pedal 15. The brake device 14 in a state of inhibiting the traveling of the main vehicle body 10 cancels inhibiting of the traveling of the main vehicle body 10 by an operation of a parking brake release lever 42 (refer to FIGS. 2A and 2B), which will be described below, in a state of an operation of stepping on the pedal 15.

The operator steps on the pedal 15, in order to trigger the brake device 14. In a state where the brake device 14 does not inhibit the traveling of the main vehicle body 10, the pedal 15 is positioned on an upper side toward the operator seat 11 as represented by a dashed line in FIG. 1A, compared with a state where the brake device 14 inhibits the traveling of the main vehicle body 10. The pedal 15 in a state of permitting the traveling of the main vehicle body 10 easily interferes with a foot of the operator who is getting off the main vehicle body 10, and thus it is possible to inhibit the operator from forgetting to step on the pedal 15.

As illustrated in FIG. 1B, the steering device 2 includes a steering handle 31 (hereinafter, referred to as the "handle 31"), an upper shaft 32, a lower shaft 33, a universal joint 34, and a valve device 35. The steering device 2 is attached to the cowl 12.

The handle 31 is disposed in front of the operator seat 11. The upper shaft 32 and the lower shaft 33 configure a steering shaft 3. An upper end portion of the upper shaft 32 is connected to the handle 31. The lower shaft 33 is disposed below the upper shaft 32, and a lower end portion of the lower shaft 33 is connected to the valve device 35.

The universal joint 34 connects a lower end portion of the upper shaft 32 with an upper end portion of the lower shaft 33 at any angle and transmits rotary motion from the upper shaft 32 to the lower shaft 33. The universal joint 34 allows the upper shaft 32 to swing with respect to the lower shaft 33 around a predetermined horizontal axis A.

The valve device 35 includes a rotary valve (not illustrated) that rotates along with the lower shaft 33 and is connected to an oil pump (not illustrated) that sends out hydraulic steering oil and a steering cylinder (not illustrated) provided with a hydraulic chamber. The valve device 35 sends the hydraulic steering oil sent out from the oil pump to the hydraulic chamber of the steering cylinder, depending on a rotating direction and a rotating amount of the lower shaft 33. The valve device 35 that is linked with rotation of the handle 31 increases a hydraulic pressure in the steering cylinder, and thus the operator can change an orientation of the vehicle wheels 13 by using the steering device 2.

Figure 2A:
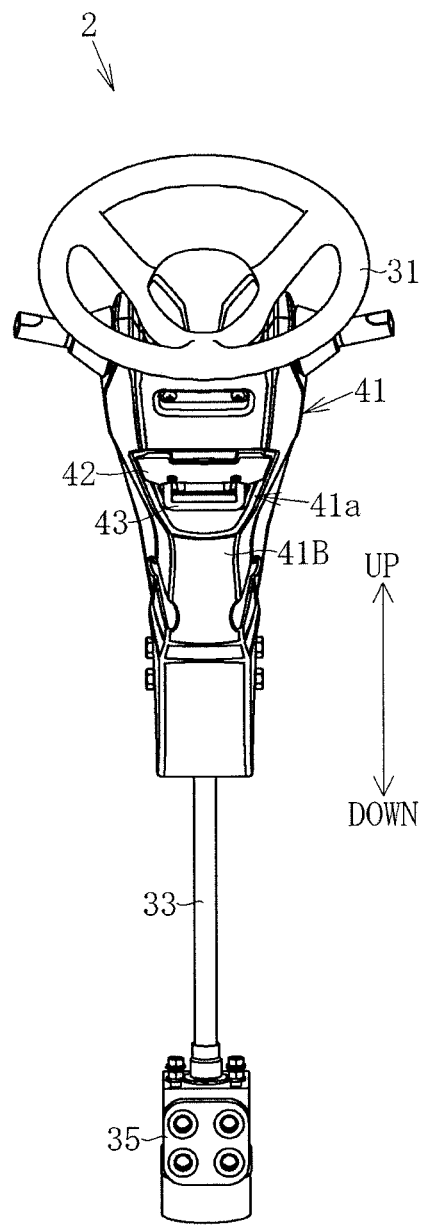
FIG. 2A is a front view of the steering device according to the embodiment.
Figure 2B:
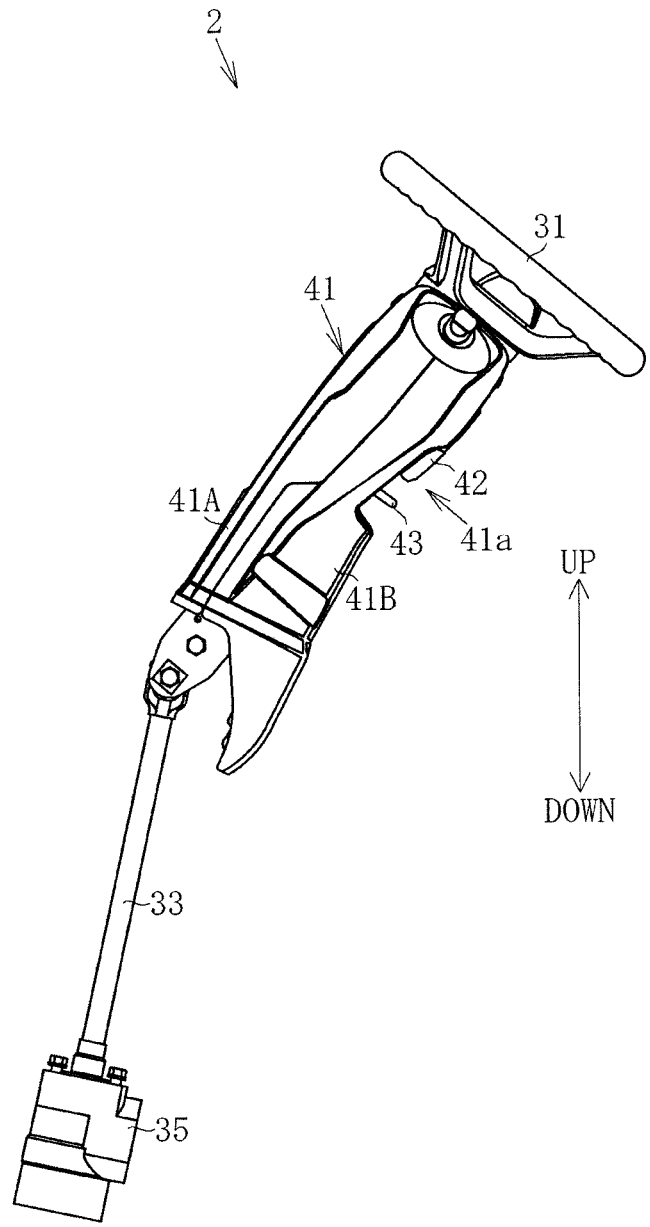
FIG. 2B is a side view thereof.

FIGS. 2A and 2B are views illustrating the external appearance of the steering device 2. FIG. 2A is a front view of the steering device 2, that is, a view when the steering device 2 is viewed from a side of the operator seat 11 in FIG. 1A. FIG. 2B is a side view of the steering device 2, that is, a view when the steering device 2 is viewed from a front side of the drawing of FIG. 1A.

As illustrated in FIGS. 2A and 2B, the steering device 2 includes a column cover 41, the parking brake release lever 42 (hereinafter, referred to as the "release lever 42"), and a tilt lock release lever 43.

The column cover 41 is configured to have an upper cover 41A and a lower cover 41B and covers the upper shaft 32. The column cover 41 has an inside (space formed by the upper cover 41A and the lower cover 41B) in which the upper shaft 32 is housed. The lower cover 41B is provided with an opening portion 41a via which the release lever 42 and the tilt lock release lever 43 are operated.

The release lever 42 covers the inside of the column cover 41 in cooperation with the lower cover 41B and is disposed below the handle 31 such that the operator who faces the handle 31 can operates the release lever 42 with any hand of the left and right hands. In a state where the release lever 42 is not operated, a part (upper and side end portions on the side of the operator seat 11) of the release lever 42 is formed and disposed to come into a state of being flat to an outline (external shape) of the lower cover 41B. In other words, outer surfaces of both the column cover 41 and the release lever 42 are continuous to each other without a step (undulation) and are formed to be flush with each other. A detailed configuration of the release lever 42 will be described below with reference to FIGS. 3 to 5.

A part of the tilt lock release lever 43 is provided to project from the inside toward the outside of the column cover 41, and the tilt lock release lever 43 is disposed below the handle 31, similarly to the release lever 42. A detailed configuration of the tilt lock release lever 43 will be described below with reference to FIGS. 3 and 4.

Figure 3:
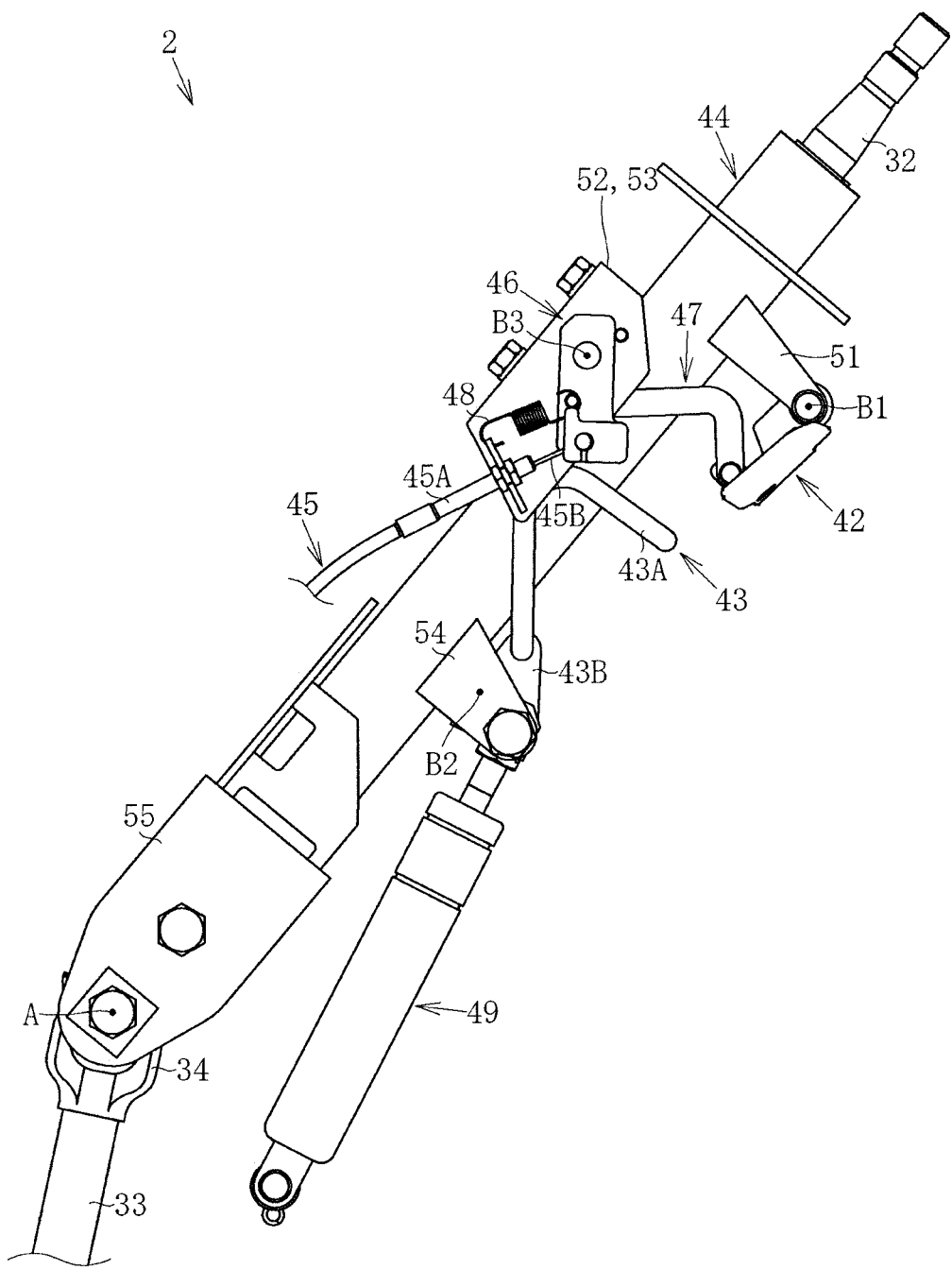
FIG. 3 is a view illustrating an internal configuration of the steering device according to the embodiment, that is, a side view thereof.
Figure 4:
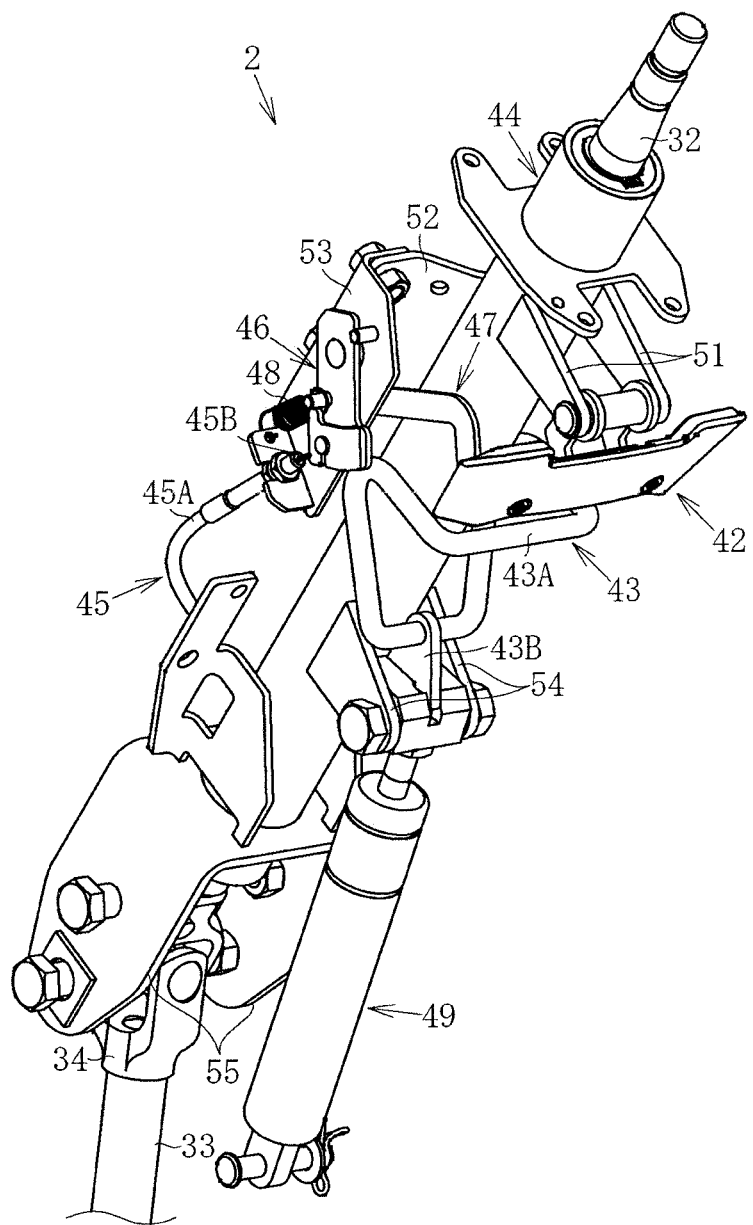
FIG. 4 is a view illustrating the internal configuration of the steering device according to the embodiment, that is, a perspective view thereof.

FIGS. 3 and 4 are views illustrating an internal configuration of the steering device 2. In FIGS. 3 and 4, the column cover 41, the handle 31, and the like are omitted.

As illustrated in FIGS. 3 and 4, the steering device 2 includes, as elements that are provided in the inside of the column cover 41, a column tube 44, a cable 45, a cable holding member 46, a link mechanism 47, a spring 48, and a lockable gas spring 49. Axes B1 to B3 in FIG. 3 are horizontal axes orthogonal to an axial direction of the upper shaft 32.

The release lever 42 is disposed under the column tube 44 and is provided to be swingable around the axis B1 with respect to the column tube 44. The release lever 42 is mechanically connected to the brake device 14 via the link mechanism 47, the cable holding member 46, and the cable 45.

The tilt lock release lever 43 is disposed under the column tube 44 and is provided to be swingable around the axis B2 with respect to the column tube 44. The tilt lock release lever 43 is configured to have a bar member 43A, which projects toward the outside of the column cover 41, and a pin pressing member 43B, which swings around the axis B2, thereby, pressing a lock release pin (not illustrated) provided to the gas spring 49. When the lock release pin is pressed, the gas spring 49 is extendable and contractible, and thus it is possible to perform adjustment of a connection angle of the upper shaft 32 with the lower shaft 33 (that is, tilt adjustment of the handle 31).

The column tube 44 covers the upper shaft 32 (except the upper and lower end portions of the upper shaft 32) and supports the upper shaft 32 rotatably via bearings (not illustrated). The column tube 44 includes lever backing brackets 51, cable backing brackets 52 and 53, gas spring backing brackets 54, and cowl backing brackets 55. The lever backing brackets 51 support the release lever 42 swingably. The cable backing brackets 52 and 53 support the cable holding member 46 swingably. The gas spring backing brackets 54 support the tilt lock release lever 43 swingably and support the gas spring 49 swingably. The cowl backing brackets 55 are attached to the cowl 12.

The cable 45 is configured to have an outer cable 45A and an inner cable 45B and connects the brake device 14 with the release lever 42. The outer cable 45A protects the inner cable 45B.

The cable holding member 46 is disposed on a side of the column tube 44 and holds the inner cable 45B. The cable holding member 46 is provided to be swingable around the axis B3 with respect to the column tube 44 and swings around the axis B3, thereby, displacing the inner cable 45B.

The link mechanism 47 connects the release lever 42 with the cable holding member 46. The link mechanism 47 has a configuration in which a swing angle of the cable holding member 46 is larger than a swing angle of the release lever 42.

The spring 48 connects the cable holding member 46 with the cable backing bracket 53. The spring 48 biases the cable holding member 46, thereby, causing the cable holding member 46 to swing in a predetermined direction.

Figure 5:
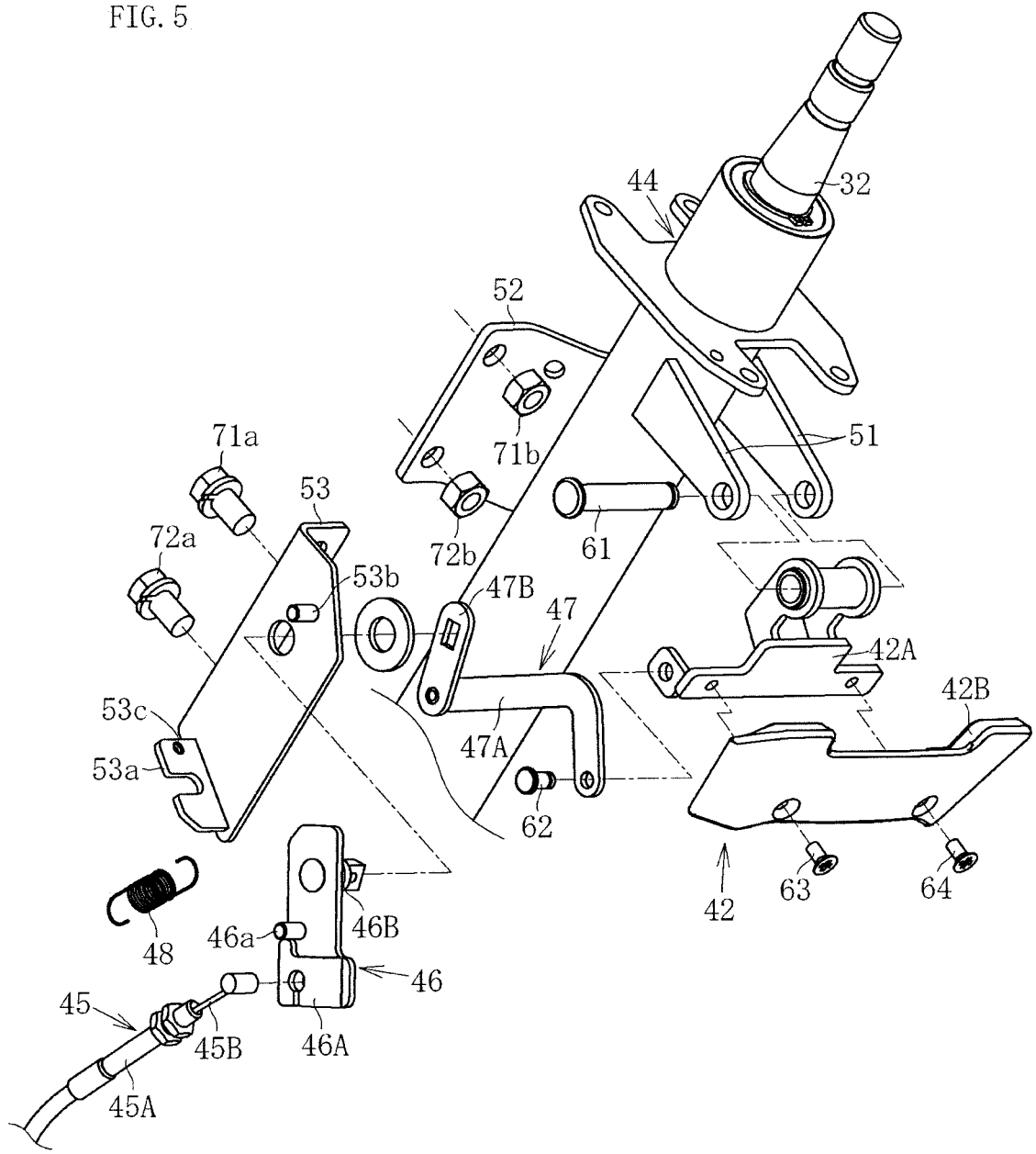
FIG. 5 is an exploded perspective view of the steering device according to the embodiment.

FIG. 5 is a view illustrating a state where the release lever 42 is detached from the column tube 44, that is, an exploded perspective view illustrating an exploded state of the release lever 42 and a configuration of connection to the release lever 42.

As illustrated in FIG. 5, the release lever 42 is configured to have a metal main lever member 42A and a resin exterior member 42B. The main lever member 42A is swingably supported by a shaft member 61 that penetrates the lever backing brackets 51 and is connected to the link mechanism 47 via a shaft member 62. The exterior member 42B is fixed to the main lever member 42A by screws 63 and 64. The exterior member 42B covers a front surface (surface opposite to the operator seat 11) and both side surfaces (that is, right and left surfaces) of the main lever member 42A.

The cable holding member 46 is configured to have a main holding member 46A and a shaft member 46B. The main holding member 46A is connected to an end portion of the inner cable 45B and is fixed to the shaft member 46B. The shaft member 46B is fixed to a second link 47B of the link mechanism 47 and penetrates the cable backing bracket 53, thereby, being provided to swing with respect to the cable backing bracket 53. The cable holding member 46 is provided with a spring hook portion 46a. The spring hook portion 46a is configured of a protrusion provided on the main holding member 46A.

The link mechanism 47 is configured to have a first link 47A and the second link 47B. The first link 47A is connected to the main lever member 42A of the release lever 42 with the shaft member 62 and is provided to be swingable with respect to the release lever 42. The first link 47A and the second link 47B are connected to be swingable with respect to each other. The second link 47B is fixed to the shaft member 46B of the cable holding member 46 and is provided to swing along with the cable holding member 46.

The spring 48 is configured of an extension coil spring that is hooked on the spring hook portion 46a of the cable holding member 46 and is hooked on a spring hook portion 53c, which will described below. The spring 48 biases the cable holding member 46 such that the cable holding member 46 abuts a swing limiting portion 53b, which will be described below.

As illustrated in FIG. 5, the lever backing brackets 51 are provided as a pair on the right and left sides at an interval in a right-left direction. The lever backing brackets 51 project from the column tube 44 downward on the side of the operator seat 11 and are integrated with the column tube 44. The lever backing brackets 51 support the release lever 42 via the shaft member 61.

The cable backing bracket 52 is provided on a back side (opposite side of the operator seat 11) of the column tube 44 and is integrated with the column tube 44. The cable backing bracket 53 is fixed to the cable backing bracket 52 with bolts 71a and 72a and nuts 71b and 72b and is disposed on a side of the column tube 44. The cable backing bracket 53 supports the shaft member 46B. The cable backing bracket 53 is provided with a cable hook portion 53a, the swing limiting portion 53b, and a spring hook portion 53c. The cable hook portion 53a is configured of a plate, on which the outer cable 45A can be hooked, and holds the outer cable 45A. The swing limiting portion 53b is configured of a protrusion that abuts the cable holding member 46 and limits swinging of the cable holding member 46 such that the release lever 42 is held at a predetermined position in a state where the operator does not operate the release lever 42. The spring hook portion 53c is configured of an open hole formed in the cable hook portion 53a.

In the configuration described above, an operation of canceling inhibiting of traveling of the main vehicle body 10 by the brake device 14 is described. When the operator who sits on the operator seat 11 grips a lower end portion of the release lever 42 with one of the right and left hands and pulls up the release lever 42 toward the operator such that the release lever 42 swings around the axis B1, the link mechanism 47 transmits motion of the release lever 42 to the cable holding member 46, and the cable holding member 46 swings around the axis B3. The inner cable 45B is tensioned by the cable holding member 46, and movement of the inner cable 45B is transmitted to the brake device 14. In this manner, an internal lock of the brake device 14 is released, and it is possible to switch from a state of inhibiting the traveling of the main vehicle body 10 to a state of permitting the traveling thereof. The operator steps on the pedal 15 and pulls up the release lever 42 so as to release the internal lock of the brake device 14, and thereby it is possible to cancel inhibiting of the traveling of the main vehicle body 10.

In the embodiment, the following effects can be achieved.

(1) The column tube 44 has the lever backing brackets 51 that support the release lever 42 swingably around the horizontal axis (axis B1) orthogonal to the axial direction of the upper shaft 32, and the release lever 42 is disposed under the column tube 44. It is easy for the operator to grab the release lever 42 with any hand of the right and left hands, and thus it is possible to easily operate the release lever 42. Further, it is possible to prevent a visual quality from being impaired.

(2) The release lever 42 is configured to come into a state of being flat to the outline (external shape) of the column cover 41. It is possible to prevent the release lever 42 from being inadvertently operated, with an object, an arm of the operator, or the like touching the release lever 42. In addition, it is possible to improve the visual quality of the steering device.

(3) The column tube 44 has the cable backing brackets 52 and 53 that support the cable holding member 46 swingably around the axis B3 parallel to the horizontal axis (axis B1), and the cable holding member 46 is disposed on the side of the column tube 44. According to the configuration, a distance between the release lever 42 and the cable holding member 46 is short such that it is possible to achieve miniaturization of the link mechanism 47.

(4) The link mechanism 47 has a configuration in which the swing angle of the cable holding member 46 is larger than the swing angle of the release lever 42. According to the configuration, it is possible to decrease an operation amount of the release lever 42, which is required to cancel the inhibiting of the traveling of the main vehicle body 10.

(5) The column cover 41 and the exterior member 42B house the link mechanism 47 and the cable holding member 46. The link mechanism 47 and the cable holding member 46 are hidden, and thereby it is possible to prevent the visual quality from being impaired.

(6) The brake device 14 in a state of inhibiting the traveling of the main vehicle body 10 cancels the inhibiting of the traveling of the main vehicle body 10 by simultaneous operations of both the pedal 15 and the release lever 42. According to the configuration, when only one of the pedal 15 and the release lever 42 is accidently operated, it is possible to prevent the inhibiting of the traveling of the main vehicle body 10 from being canceled.

The invention is not limited to the embodiment described above, and it is possible to appropriately modify the configurations described above. For example, the embodiment may be modified and carried out as follows, and the following modifications may be appropriately combined.

As long as it is possible to cancel inhibiting of the traveling of the main vehicle body 10 by the operation of the release lever 42, the release lever 42 and the brake device 14 may not be mechanically connected to each other. It is also possible to configure the steering device 2 without the cable 45 and the cable holding member 46.

The invention may be applied to a cargo handling vehicle other than a battery powered counterbalance forklift. For example, the invention can be applied to an internal combustion forklift or a reach forklift.

What is claimed is:

1. A steering device comprising:
   a steering handle;
   an upper shaft to which the steering handle is connected;
   a lower shaft that is disposed below the upper shaft;
   a universal joint that connects the upper shaft with the lower shaft;
   a column tube that covers an outer periphery of the upper shaft;
   a parking brake release lever;
   a cable that is connected to a parking brake device;
   a cable holding member that holds the cable; and
   a link mechanism that links the parking brake release lever with the cable holding member,
   wherein the column tube has a lever backing bracket that supports the parking brake release lever swingably around a horizontal axis orthogonal to an axial direction of the upper shaft, and the parking brake release lever is disposed under the column tube, and
   wherein the column tube has a cable backing bracket that supports the cable holding member swingably around an axis parallel to the horizontal axis, and the cable holding member is disposed on a side of the column tube.

2. The steering device according to claim 1, wherein the link mechanism has a configuration in which a swing angle of the cable holding member is larger than a swing angle of the parking brake release lever.

3. The steering device according to claim 1, further comprising:
   a column cover that covers the column tube,
   wherein the parking brake release lever has a metal main lever member and a resin exterior member that covers the main lever member, and
   wherein the column cover and the exterior member house the link mechanism and the cable holding member.

4. A cargo handling vehicle comprising:
   a main vehicle body;
   a parking brake device that inhibits traveling of the main vehicle body;
   a steering handle;
   an upper shaft to which the steering handle is connected;
   a lower shaft that is disposed below the upper shaft;
   a universal joint that connects the upper shaft with the lower shaft;
   a column tube that covers an outer periphery of the upper shaft;
   a parking brake release lever;
   a cable that is connected to the parking brake device;
   a cable holding member that holds the cable; and
   a link mechanism that links the parking brake release lever with the cable holding member,
   wherein the column tube has a lever backing bracket that supports the parking brake release lever swingably around a horizontal axis orthogonal to an axial direction of the upper shaft, and the parking brake release lever is disposed under the column tube, and
   wherein the column tube has a cable backing bracket that supports the cable holding member swingably around an axis parallel to the horizontal axis, and the cable holding member is disposed on a side of the column tube.

5. The cargo handling vehicle according to claim 4, wherein the link mechanism has a configuration in which a swing angle of the cable holding member is larger than a swing angle of the parking brake release lever.

6. The cargo handling vehicle according to claim 4, further comprising:
   a column cover that covers the column tube,
   wherein the parking brake release lever has a metal main lever member and a resin exterior member that covers the main lever member, and
   wherein the column cover and the exterior member house the link mechanism and the cable holding member.

7. The cargo handling vehicle according to claim 4, further comprising:
   a parking brake pedal that operates the parking brake device, wherein the parking brake device in a state of permitting the traveling of the main vehicle body starts to inhibit the traveling of the main vehicle body by an operation of the parking brake pedal, and wherein the parking brake device in a state of inhibiting the traveling of the main vehicle body cancels the inhibiting of the traveling of the main vehicle body by simultaneous operations of both the parking brake release lever and the parking brake pedal.

* * * * *